(12) United States Patent
Bullock et al.

(10) Patent No.: US 8,549,530 B1
(45) Date of Patent: Oct. 1, 2013

(54) SYSTEM AND METHOD FOR DISTRIBUTED LOGIN WITH THREAD TRANSFER TO A DEDICATED PROCESSOR NODE BASED ON ONE OR MORE IDENTIFIERS

(75) Inventors: John Bullock, Denver, CO (US); Zion Lo, Highlands Ranch, CO (US)

(73) Assignee: IQNavigator, Inc., Centennial, CO (US)

( * ) Notice: Subject to any disclaimer, the term of this patent is extended or adjusted under 35 U.S.C. 154(b) by 227 days.

(21) Appl. No.: 13/053,066

(22) Filed: Mar. 21, 2011

(51) Int. Cl.
*G06F 9/46* (2006.01)
*G06F 9/455* (2006.01)

(52) U.S. Cl.
USPC .......................... 718/104; 718/102; 718/105

(58) Field of Classification Search
None
See application file for complete search history.

(56) References Cited

U.S. PATENT DOCUMENTS

| | | | |
|---|---|---|---|
| 6,542,933 B1 | 4/2003 | Durst, Jr. et al. | |
| 6,578,068 B1 | 6/2003 | Bowman-Amuah | |
| 6,587,866 B1 * | 7/2003 | Modi et al. | 718/105 |
| 7,159,221 B1 * | 1/2007 | Willen et al. | 718/104 |
| 7,406,524 B2 | 7/2008 | Sadot et al. | |
| 7,464,143 B2 | 12/2008 | Pieper et al. | |
| 7,548,888 B2 | 6/2009 | Schutz | |
| 7,596,804 B2 | 9/2009 | Toomey et al. | |
| 8,161,491 B2 * | 4/2012 | Krishnakumar et al. | 718/105 |
| 2009/0024746 A1 * | 1/2009 | Welch | 709/228 |
| 2009/0112885 A1 | 4/2009 | Markovich | |
| 2009/0187915 A1 * | 7/2009 | Chew et al. | 718/104 |
| 2009/0276754 A1 | 11/2009 | Lind et al. | |
| 2010/0088417 A1 | 4/2010 | Amemiya et al. | |
| 2012/0137077 A1 * | 5/2012 | Shah et al. | 711/125 |

FOREIGN PATENT DOCUMENTS

WO 2004/088543 A1 10/2004

\* cited by examiner

*Primary Examiner* — Meng An
*Assistant Examiner* — Bradley Teets
(74) *Attorney, Agent, or Firm* — Perkins Coie LLP; Brian P. Kinnear

(57) ABSTRACT

A distributed networked computer system is provided. The distributed networked computer system receives processing threads from a plurality of workstations and distributes the processing threads to selected processing nodes through a load balancer. The load balancer is configured to recognize certain enterprise users and transfer the processing threads from the certain enterprise users to dedicated processing nodes dedicated to processing threads of those certain users.

13 Claims, 7 Drawing Sheets

SYSTEM AND METHOD FOR DISTRIBUTED LOGIN WITH THREAD TRANSFER TO A DEDICATED PROCESSOR NODE BASED ON ONE OR MORE IDENTIFIERS

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to load balancing systems, methods, and processes, and more specifically, to systems, methods, and processes that allow a distributed login network to securely transfer a user to an identified processing node based on identifiers to conserve processing resources.

2. Background

Shared, or networked, computers are relatively common. Many companies have intranets where workstations may access the same set of applications, processors, peripheral devices, and memories or storage, etc. (generically referred to as "equipment"). Still more people and companies access equipment over the Internet or other public access networks.

Referring now to FIG. 1, an exemplary prior art networked computer system 100 is provided. Networked computer system 100 may facilitate the operation of a number of applications and software packages. As shown, networked computer system 100 is a distributed system with a number of workstations $102_{1-n}$ coupled to processing nodes $104_{1-m}$ through one or more networks 106. Generally, there are many more workstations 102 than there are processing nodes 104, but workstations 102 may be the same or less than the processing nodes 104 in some systems. The processing nodes 104 may be coupled to a memory 108, which could be a single memory or a distributed memory. Processing nodes 104 may be connected to memory 108 through a second network not specifically shown. Workstations 102 may have applications and functionality loaded onto a particular user's workstation (fat or thick client) or hosted by a server that is accessed by the workstation (thin client). Workstations 102 may be a user terminal, a desktop computer, a laptop computer, a mobile computer, a handheld computer, smartphone, personal digital assistant or the like. Processing nodes 104 generally include at least one and often several central processing units and memory. Processing nodes 104 may include servers, mainframes, or other conventional processors. Network 106 may be any conventional network such as a LAN, WAN, WLAN, WiFi, Cellular, Internet, other public or private network.

In many cases, networked computer system 100 includes a load balancer 110. Load balancer 110 would distribute the work requests, generically referred to as threads, from workstations 102 and transfer the thread to the processing node 104 based on conventional load balancing protocols. If all the processing nodes 104 are at full processing capacity, the thread may be held in a cache until a processor becomes available. However, prior to the processing nodes 104 being at full capacity, load balancer 110 may distribute the threads in any of a number of conventional mechanisms. Generally, the processing nodes 104 are selected based on factors, such as current processing capacity, routing capacity, throughput, processing return time, and the like. In other words, load balancer attempts to equate one or more design features associated with the system across the processing nodes. Processing nodes 104 may access memory 108, which could be a volatile or non-volatile memory, database, or other storage device, or other peripheral devices to process certain threads and the like. The processing nodes 104 may simply access memory 108 on an as needed basis. The processing node 104, however, generally functions more efficiently if the data, processing rules, or the like necessary to process the thread request is uploaded from memory 104 to a local memory associated with the specific processing node 104.

Moreover, conventional load balancers 110 generally transfers threads to particular processing nodes without regard for the user associated with the processing node because load balancer 110 does not have any information about the user. Processing nodes 104 in secure systems may require users to login or otherwise provide verification of rights to use the system, but the load balancer 110 does not have that information as the login procedures are often processed subsequent to the assignment of the thread to a particular processing node 104. Thus, potential efficiencies in the processing nodes 104 are lost.

There is, therefore, a need in the art to provide a load balancing system, especially in secure networks, where an unidentified user can be transferred from a randomly assigned processing node to an uniquely assigned processing node to provide more efficient use of the processing nodes.

SUMMARY

Aspects of the technology of the present application include systems, methods, and apparatuses to receive processing threads, from users and distribute the threads to processing nodes. In particular, a method to transfer application threads to dedicated processing nodes on-recognition of a user in a secure, networked, computer system comprises the steps performed on at least one processor comprising of initially receiving a thread at a load balancer that distributes the threads among a plurality of processing nodes wherein the thread is from an unknown user. The load balancer, after receipt of the thread, assigns the thread to one of the plurality of processing nodes that identifies the identity of the user that initiated the thread. Next, it is determined whether a dedicated processing node exists for processing threads of the identified user and, if a dedicated processing node is determined to exist, transferring the thread to the dedicated processing node to be processed by the dedicated processing node; and, if a dedicated processing node is determined to not exist, processing the thread at an assigned non-dedicated processing node.

Other aspects of the technology of the present application include a distributed computer network system comprising a plurality of processing nodes and at least one duster comprising at least one dedicated processing node. The processing nodes and the dedicated processing node process threads received from workstations. The threads received from the workstation are received at a load balancer that assigns one of the processing nodes to identify the user at the workstation. The load balancer, on identification of the user, determines whether a dedicated processing node exists for the identified user and transfers the thread to the dedicated or non-dedicated processing node based on load balancing rules.

DETAILED DESCRIPTION

The technology of the present application will now be explained with reference to networked computer systems and the figures where remote workstations are randomly assigned to processing nodes prior to identification of the user. The technology, in general, is described in relation to conventional and public networked computer systems; however, the technology of the present application would be useful for any distributed system, public or private, that uses load balancers to allocate processing resources. Moreover, the technology of the present application is explained using a conventional operating system, such as, for example, the Unix Operating Systems or a WINDOWS® operating system, or the like. One of ordinary skill in the art on reading the disclosure will now recognize that the technology of the present application will be useful in other environments and other operating systems. Other operating systems include, for example, Linux, Mac OS X, Solaris, to name but a few conventional operating systems. Moreover, while described as operating on a thin client, the technology of the present application also is useful using a fat client. A thin client would use a remote server or other processor to run the application being accessed by the thin client instead of the local processor as in a fat client. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
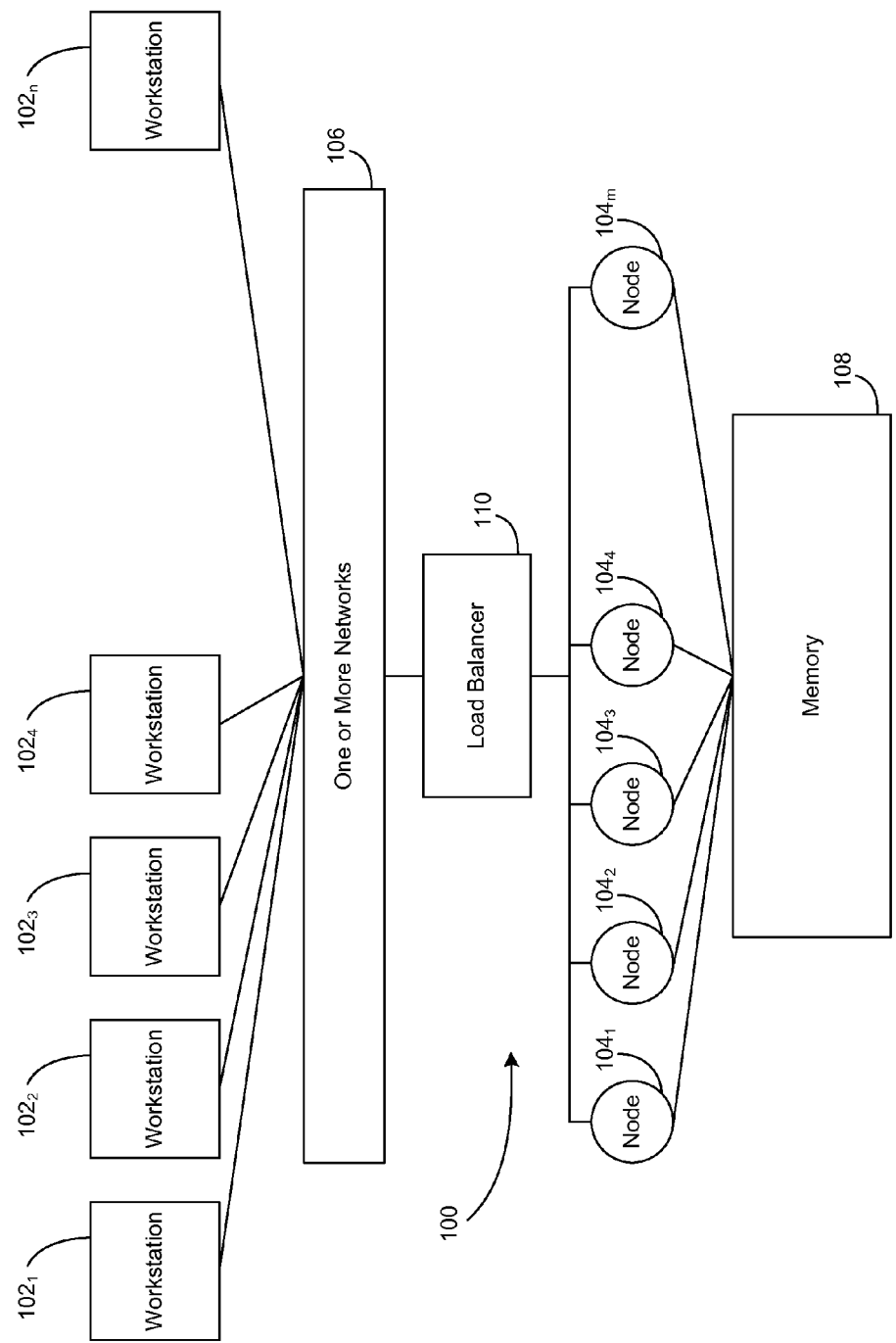
FIG. 1 is a functional block diagram of a networked computer system consistent with the technology of the present application.
Figure 2:
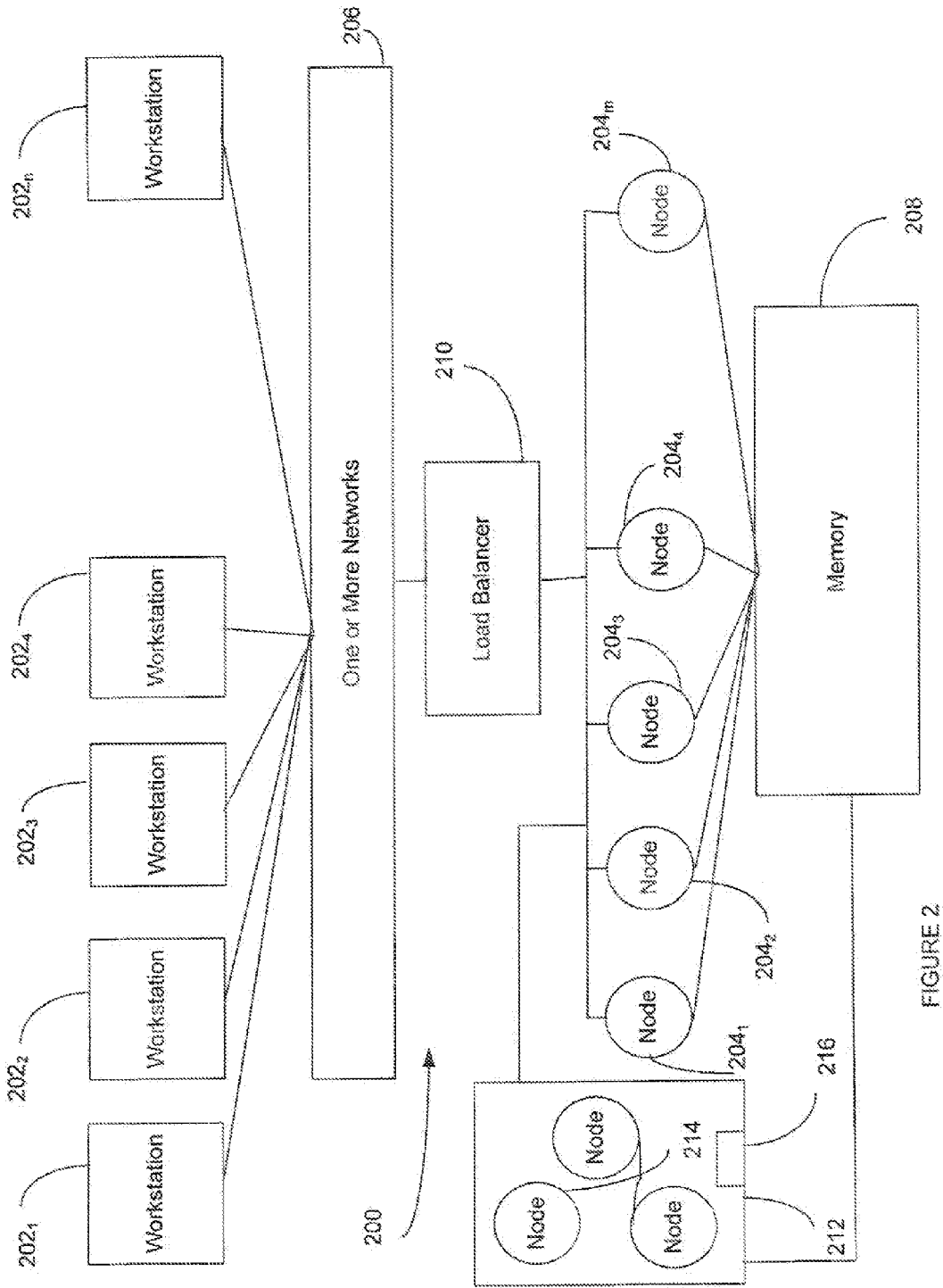
FIG. 2 is a functional block diagram of a networked computer system consistent with the technology of the present application.
Figure 3:
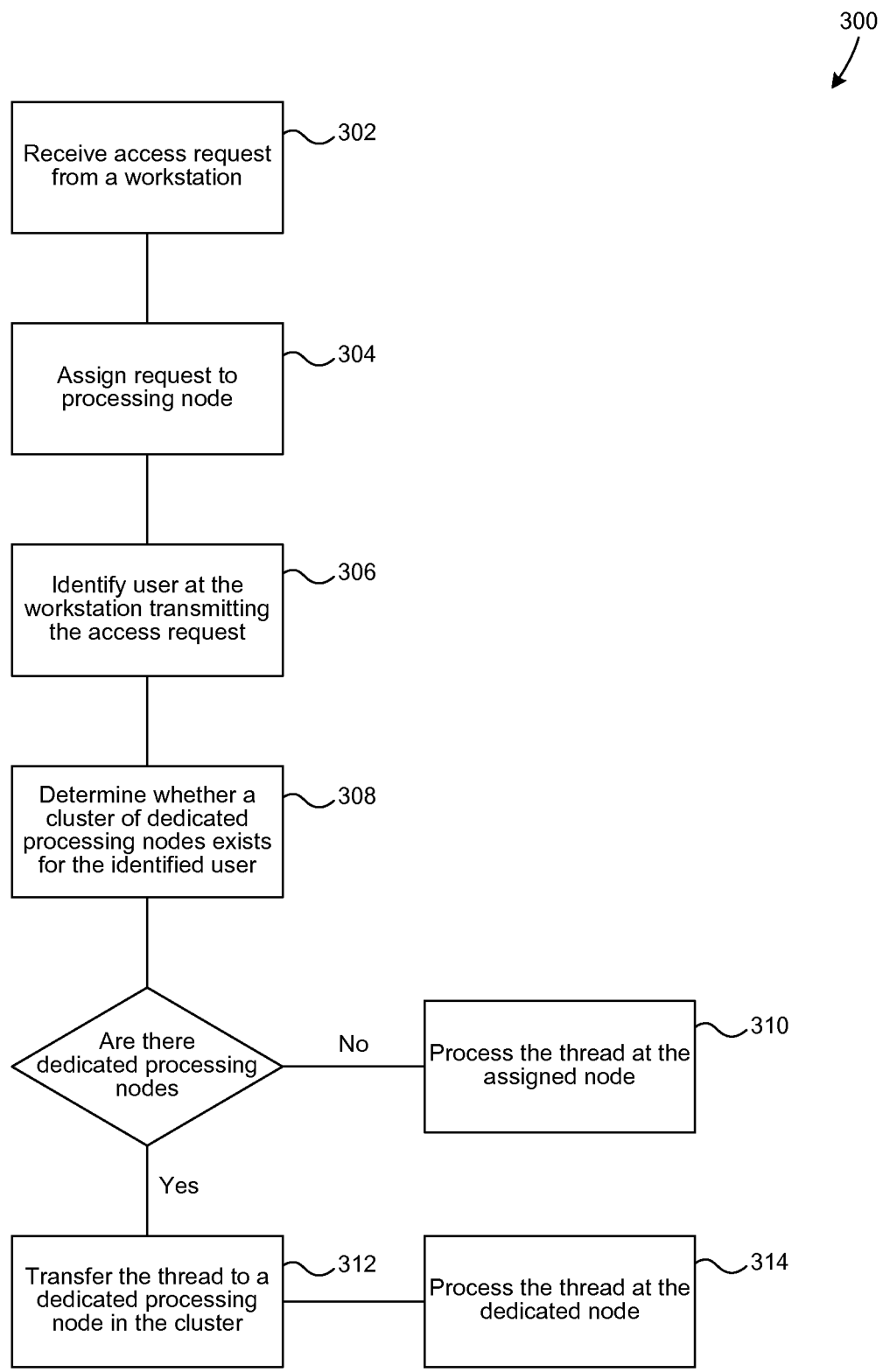
FIG. 3 is a flowchart illustrative of a methodology according to one aspect of the technology of the present application.

Referring to FIG. 2, a networked computer system 200 consistent with the technology of the present application is provided. Networked computer system 200 provides a number of workstations. $202_{1-n}$ that are networked to a number (typically less) of processing nodes $204_{1-m}$ through a network 206. The distribution of threads between workstations 202 and processing nodes 204 is in this exemplary embodiment accomplished by load balancer 210 executing a load balancing protocol, which could be any of a number of known conventional protocols or proprietary protocols. In secured processing systems, once distributed to an associated processing node 204, the processing node would commence a login or identification protocol in which the user at workstation 202 can be identified.

Networked computer system 200 further includes a cluster 212 of dedicated processing nodes $214_{1-l}$. To process threads, the processing nodes (whether dedicated or non-dedicated) typically need to have access to information about the enterprise for which it is processing the thread. Often the processing nodes are required to upload from memory some business rules or the like from the remote memory 208 into the local memory associated with the processing node. This causes some inefficiencies if a large enterprise requires the same business rules to be uploaded to a number of different processing nodes. To alleviate the inefficiency, large enterprises may have one or more dedicated processing nodes 214 preloaded with the required information. This results in efficiencies for the large enterprise client as well as other clients as it avoids the repetitive upload of the large clients information. It is envisioned that dedicated processing nodes will be dedicated at system initiation with preloaded information, but it is possible to dynamically assign dedicated processing nodes by waiting for the first upload of the enterprises information and then dedicating the assigned processing node as the dedicated processing node. Large client or large enterprise should be considered as whether the processing required by the client is sufficient to justify dedicating one or more processing nodes to that particular client's threads. Cluster 212 of dedicated processing nodes 214 alone receive threads from specific identified users of networked computer system 200 as will be explained further below. Thus, cluster 212 generally is not included in the protocols associated with load balancer 210. Cluster 212 may have multiple dedicated processing nodes $214_{1-l}$, as shown, or a single dedicated; processing node 214. Largely, the number of dedicated processing nodes 214 would depend on the processing requirements of the user associated with the dedicated processing nodes 214. When the cluster 212 includes multiple dedicated processing nodes $214_{1-l}$, the cluster 212 may include a duster load balancer 216. The cluster load balancer 216 would balance load among the dedicated processing nodes 214 in a manner similar to the load balancer 210

As shown by methodology 300, the process begins by receiving request for access from a workstation 202 at load balancer 210, step 302. Load balancer 210, following a conventional protocol to balance the load of processing nodes 204 directs the access request to one of the plurality of available processing nodes 204, step 304. The assigned processing node 204 may initiate a login or other procedure, step 306, to identify the user sending the request. Login procedures are generally known in the art and will not be explained herein except as necessary for understanding of the technology of the present application. Login procedures should be construed relatively broadly to include any methodology associated with identification of the user. Once the user at workstation 202 is identified, the assigned processing node determines whether a cluster 212 of dedicated processing nodes 214 exists for the identified user, step 308. If no dedicated processing nodes exist, the assigned processing node 204 processes the thread, step 310. If a dedicated processing node 214 exists in a duster 212, the assigned processing node 204 may transfer the thread back to the load balancer with a marker to direct the load balancer 210 to transfer the thread to the dedicated processing node 214, step 312. The dedicated processing node 214 would process the thread, step 314. Alternatively to having the assigned processing node 204 transfer the thread back to the load balancer for reassignment to the dedicated processing node 214, the assigned processing node 204 may have the ability to seamlessly transfer the thread directly to the dedicated node or the like.

Figure 4:
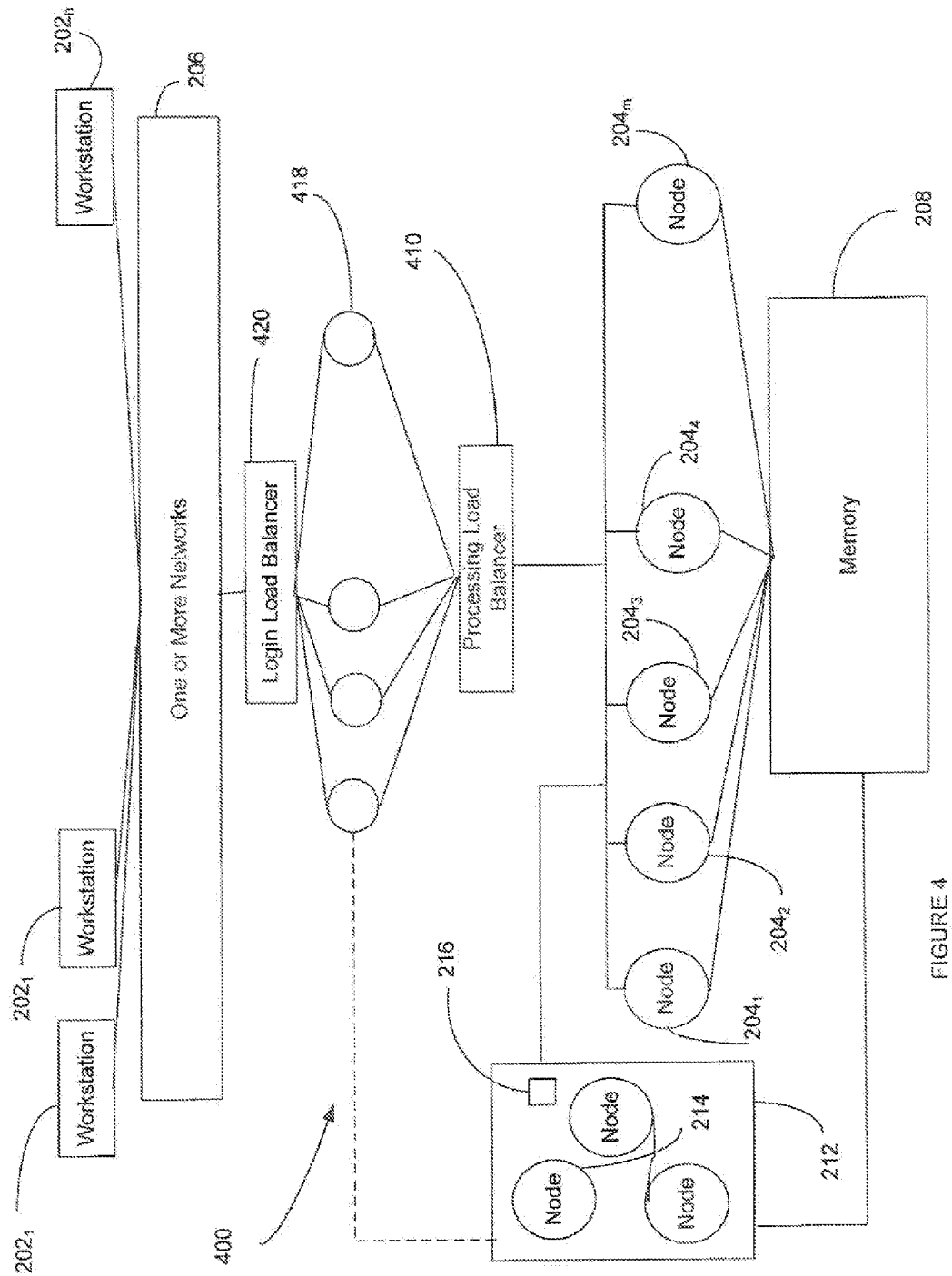
FIG. 4 is a functional block diagram of a networked computer system consistent with the technology of the present application.
Figure 5:
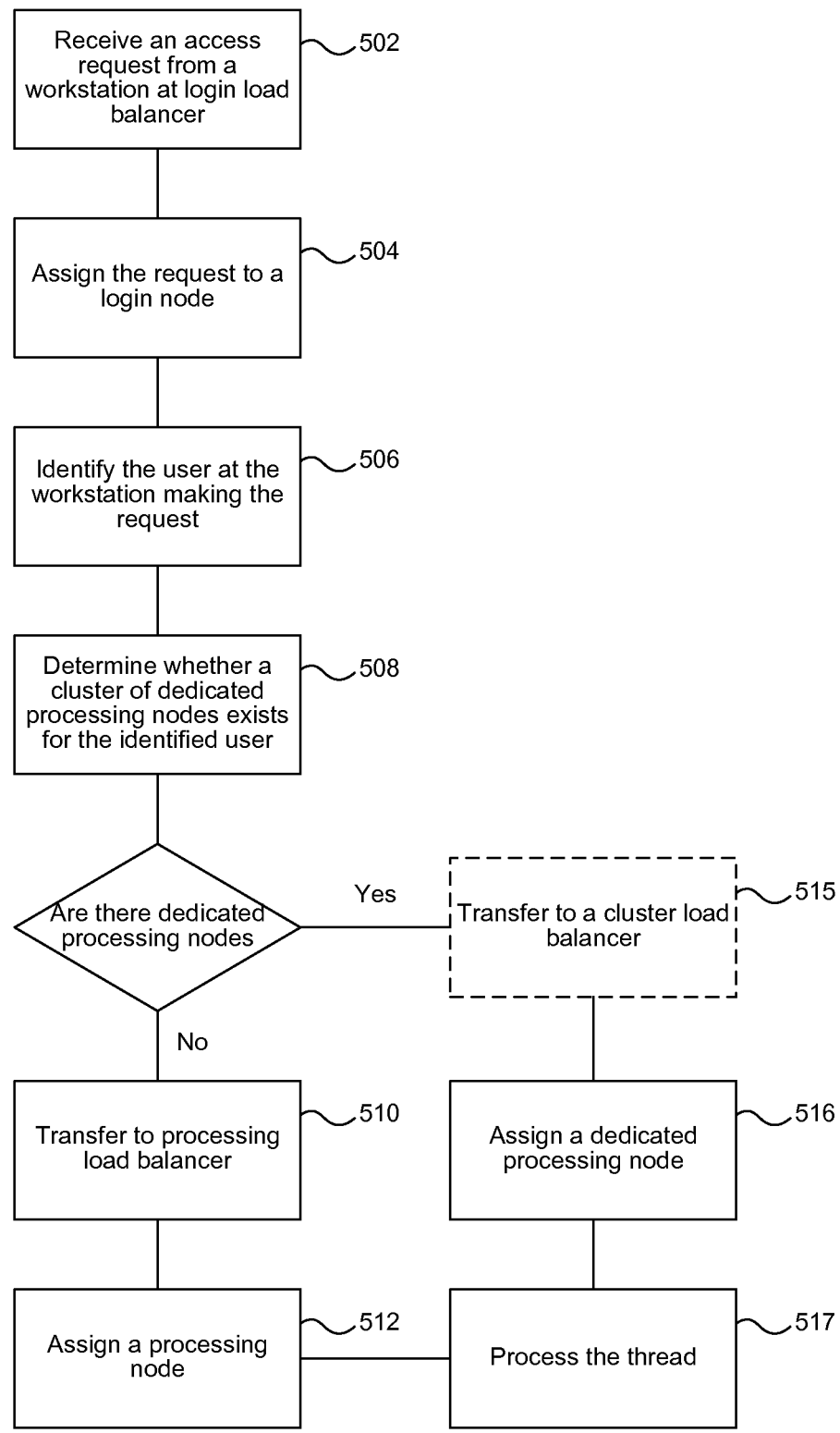
FIG. 5 is a flowchart illustrative of a methodology according to one aspect of the technology of the present application.

Referring now to FIG. 4, networked computer system 400 consistent with the technology of the present application is provided. Networked computer system 400 is similar to system 200 described above. Networked computer system 400 includes a plurality of workstations $202_{1-n}$ networked to a plurality of login nodes 418 that perform the login procedure to identify the user associated with any workstation and or access request. A login load balancer 420 distributes the login or access requests to one of the login nodes 418 based on conventional protocols associated with the login requests. While not specifically shown to avoid cluttering the diagram, login nodes 418 would be capable of accessing the memory 208. The login node would proceed to identify the user using a conventional login or other identification protocols. Once identified, the login nodes would provide the identified user to the processing load balancer 410. Processing load balancer 410 would use the identification of the user to determine whether a cluster 212 of dedicated processing nodes 214 exists for the identified user absent other load balancing protocols. Alternatively, login nodes 418 may determine whether the user of workstation 202 is associated with the duster 212 of dedicated processing nodes 214 and transfer the thread directly to the cluster 212 as shown in phantom. In this case, processing load balancer may not be connected to the cluster 212. If the user at workstation 202 is not associated with the cluster 212 of dedicated processing nodes 214, the processing load balancer 410 distributes the threads to processing nodes 204 in a conventional manner. While shown as separate units, login nodes 418 and processing nodes 204 may, in fact, be integrated units and login load balancer 420 and processing load balancer 410 may be integrated units where the threads are moved back and forth between the processors as required.

As shown by methodology 500, the process begins by receiving a request for access from a workstation 202 at login load balancer 420, step 502. The login load balancer 42Q would assign the request to a login node 418, step 504. The assigned login node 204 may initiate a login or other procedure, step 506, to identify the user sending the request. Login procedures are generally known in the art and will not be explained herein except as necessary for understanding of the technology of the present application. Login procedures should be construed relatively broadly to include any methodology associated with identification, of the user. Once the user at workstation 202 is identified, the assigned login node determines whether a cluster 212 of dedicated processing nodes 214 exists for the identified user, step 508. If no dedicated processing nodes exist, the assigned login node 204 transmits the thread to processing load balancer 410, step 510. The processing load balancer 410 would assign the thread to a processing node 204, step 512, that receives and processes the thread, step 514. If a dedicated processing node 214 exists in a cluster 212, the assigned login node 11 may transfer the thread to the dedicated processing node 214, step 516, as shown in phantom. Alternatively, the assigned login node 118 would transfer the thread, with a tag or marker to identify the fact that the dedicated processing node exists for the thread, to the processing load balancer 410 that transfers the thread to dedicated node, step 516. Optionally, the assigned login node 418 or the processing load balancer 410 may transfer the thread to a duster load balancer 216 that assigns a dedicated processing node, step 515. The dedicated processing node 214 would process the thread, step 514.

Figure 6:
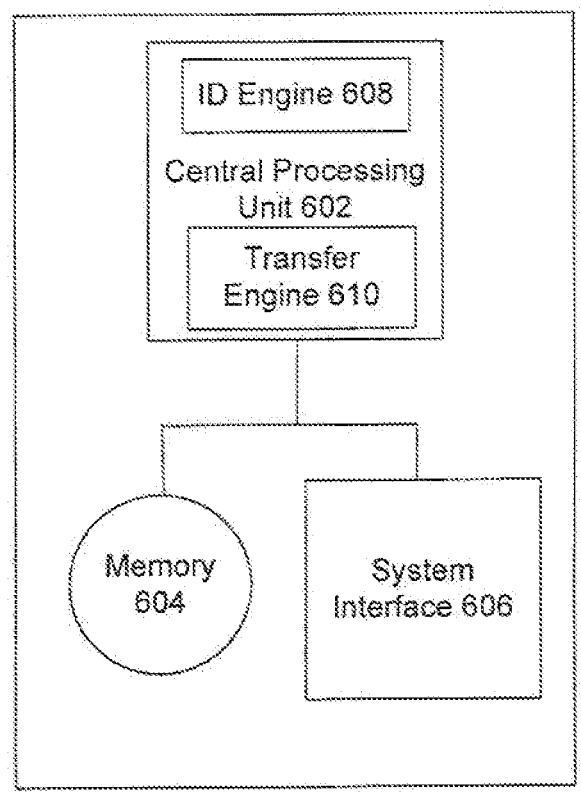
FIG. 6 is a functional block diagram of a transfer engine consistent with the technology of the present application.

Referring now to FIG. 6, an exemplary transfer engine 600 is provided. The transfer engine 600 may be associated with any of the above referenced processing nodes or load balancers. Generally, transfer engine 600 may include any number of processing devices, such as, for example, a server, a mainframe, a desktop computer, a laptop computer, a smartphone, mobile computer, or the like. The transfer engine 600 includes a central processing unit 602 that may be, for example, a microprocessor, chipsets, field programmable gate array logic, or the like, that controls the major functions of the transfer engine 600, such as, for example, login procedures and functionality, identification procedures and functionality requesting thread transfers and the like. Central processing unit 602 also processes various inputs and/or data that may be required to operate the transfer engine 600 as is conventional in the art. The transfer engine 600 also includes a local cache or memory 604 that is interconnected with central processing unit 602. The local cache or memory 604 may be remotely located or co-located with central processing unit 602. The memory 604 stores processing instructions to be executed by central processing unit 602. The memory 604 also may store data necessary or convenient for operation of the transfer engine 600. For example, the memory 604 may store processing rules and datasets necessary to process the threads by transfer engine 600. Note, dedicated processing nodes may have the memory 604 preloaded with information necessary for the dedicated operation to efficiently use the processor capabilities. Memory 604 may be any conventional media and in include either or both volatile or non-volatile memory. The transfer engine 600 includes a system interface 606 that may be, for example, a data port such as a universal serial bus port, PCI bus, or the like. Processing node 600 may have a login or identification engine 608. As shown, ID engine 608 is contained as a module of central processing unit 602, but could function separately as a matter of design choice. The transfer engine 600 also may include a transfer engine 610. Transfer engine 610' would use the identification of the user's organizational enterprise, for example, to determine whether the cluster 212 of dedicated nodes 214 exists for the enterprise. If such a dedicated node or nodes exist, transfer engine 610 would transfer the thread to the dedicated node or dedicated node load balancer as indicated by a rules database.

Figure 7:
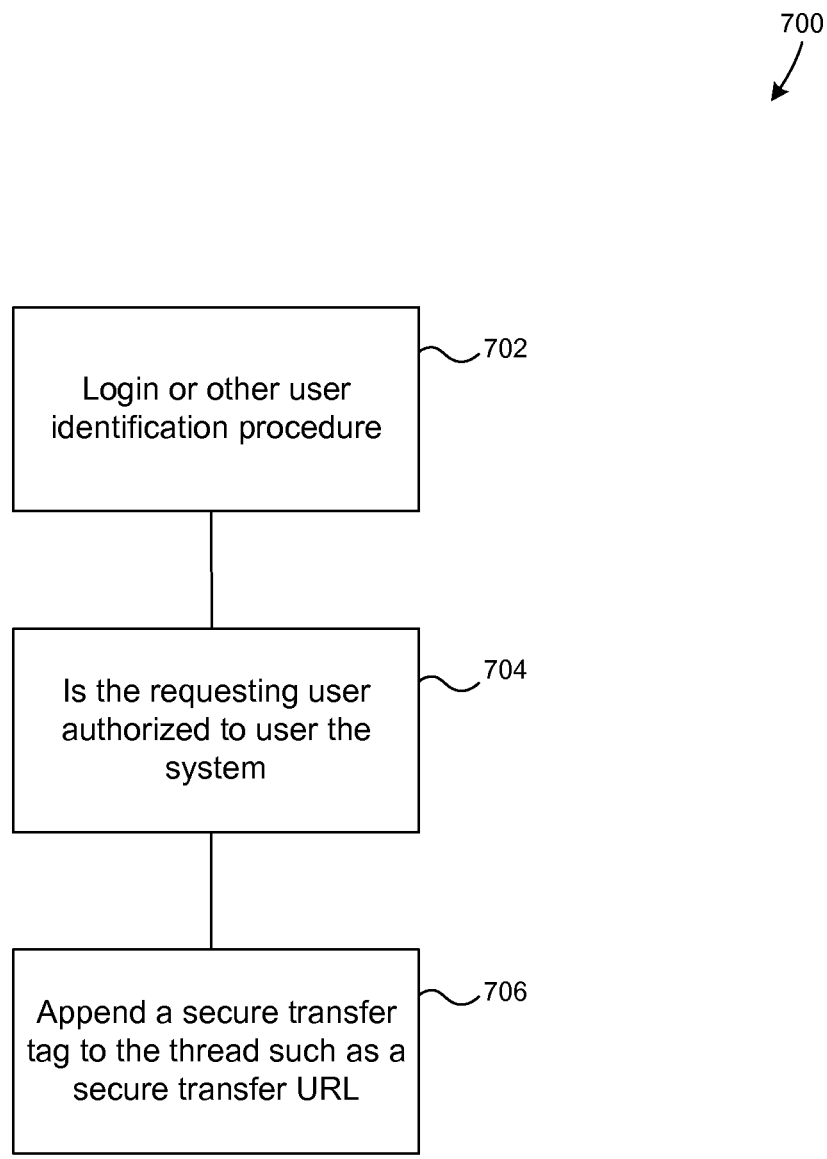
FIG. 7 is a flowchart illustrative of a methodology according to one aspect of the technology of the present application.

As can be appreciated, one issue with transfers of the threads between processing nodes and/or dedicated processing nodes is maintaining the identity and authorizations after a user login or other identification procedure. Referring to FIG. 7, a methodology regarding maintaining the identity and the authorization is provided, by flowchart 700 that is consistent with the technology of the present application. The processing begins at step 702 with a login or other user identification procedure, step 702. Next, it is determined whether the user is authorized to use the system, step 704. If it is determined that the user is authorized, a securely signed login transfer URL (or other tag, marker, flag or the like) is appended to the thread by the processing node performing the identification functionality, step 706. In one embodiment of the technology, the secure transfer information is appended to the thread by combining multiple values into a parameterized URL. For example, in one case, the destination node is provided as a first value and an user identification is provided as a second value. These values are combined and a digital signature is provided as an overlay. The digital signature over the combination of the destination node and user identification provides a secure way to transfer the thread to the dedicated node (which is the destination node) as the dedicated node will have the value to unbundle the user identification from the signed parameterized URL. In reference to the above, the transfer URL or other tag, marker, flag, or the like, may include a transfer location identifier if the user is associated with a duster of one or more dedicated processing nodes. Thus, still in reference to the above, once identified and the thread appended, the thread may be transferred back to the load balancer for transfer to the dedicated processing node, should one exist, of transferred back to the load balancer for secure transfer to a processing node that is assigned based on the load balancer assignment protocols.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access, Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to transfer application threads to dedicated processing nodes in a secure, networked, computer system, the method comprising the steps performed on at least one processor comprising:
    providing a secure, networked, computer system comprising a plurality of processing nodes and a load balancer, wherein the plurality of processing nodes comprises at least one dedicated processing node for processing threads from an enterprise;
    initially receiving a thread at the load balancer that distributes threads among the plurality of processing nodes wherein the thread is from a user that has not been identified;
    selecting by the load balancer one processing node from the plurality of processing nodes to which the received thread will be assigned;
    assigning and transferring the thread to one processing node selected from the plurality of processing nodes;
    identifying an identity of the user, wherein the user becomes an identified user;
    determining whether the identified user is from the enterprise having the at least one dedicated processing node;
    if the at least one dedicated processing node is determined to exist, transferring the thread from the processing node selected to the at least one dedicated processing node to be processed by the at least one dedicated processing node; and
    if the at least one dedicated processing node is determined to not exist, processing the thread at the one processing node selected by the load balancer;
    appending a secure transfer identification to the thread subsequent to the step of identifying an identity of the user;
    routing the thread with the secure transfer identification back to the load balancer to be transferred to the at least one dedicated processing node.

2. The method of claim 1 wherein the load balancer recognizes the secure transfer identification and routes the thread directly to the at least one dedicated processing node if the secure transfer identification is assigned the at least one dedicated processing node.

3. The method of claim 1 wherein the step of providing at least one dedicated processing node comprises providing a cluster that comprises a plurality of dedicated processing nodes and a cluster load balancer and the step of transferring the thread to the at least one dedicated processing node to be processed by the at least one dedicated processing node further comprises the steps of: transferring the thread to a cluster load balancer and routing the thread to one of the plurality of dedicated processing nodes contained in the cluster as determined by the cluster load balancer.

4. The method of claim 1 wherein the identifying step comprises a login.

5. The method of claim 4 wherein the load balancer initially assigns one login node selected from a plurality of login nodes to complete the login procedure.

6. The method of claim 5 wherein the one login node transfers the thread back to the load balancer subsequent to the login procedure for distribution to the one processor node selected from the plurality of processing nodes wherein the one processor node is selected from the group of processing nodes consisting of the at least one dedicated processing node or a remainder of the plurality of processing nodes.

7. A method to transfer application threads to dedicated processing nodes on recognition of a user that belongs to an enterprise having at least one dedicated processing node in a secure, networked, computer system, the method comprising the steps performed on at least one processor comprising:

provid ing a networked computer system comprising a plurality of processing nodes, wherein the plurality of processing nodes comprises at least one dedicated processing node;

initially receiving a thread at a login load balancer that distributes threads among a plurality of login nodes wherein the thread is from a user that has not been identified;

selecting by the load balancer one login node from the plurality of login nodes to which the received thread will be assigned;

assigning the thread to the selected one login node from the plurality of login nodes;

conducting a login procedure to determine an identity of the user;

transferring the thread with the identity of the user to a processing node load balancer;

determining whether the user is a member of an enterprise based on the identity having at least one dedicated processing node;

if the at least one dedicated processing node is determined to exist, transferring the thread to the dedicated processing node to be processed by the dedicated processing node without regard for the load balancing protocols; and if the at least one dedicated processing node is determined to not exist, transferring the thread to another processing node selected from the plurality of processing nodes using the load balancing protocols to select the another processing node;

appending a secure transfer identification to the thread subsequent to the step of identifying an identity of the user;

routing the thread with the secure transfer identification back to the load balancer to be transferred to the at least one dedicated processing node.

8. The method of claim 7 wherein the step of transferring the thread to a dedicated processing node comprises transferring the thread to a cluster containing a plurality of dedicated processing nodes and at least one cluster load balancer; and assigning a selected dedicated processing node from the plurality of dedicated processing nodes based on a load balancing protocol of the at least one cluster load balancer.

9. A distributed computer network system comprising:

a first load balancer configured to receive processing threads from a plurality of enterprises wherein any one processing thread when received is from at least one workstation of an enterprise not yet identified;

a plurality of processing nodes coupled to the first load balancer and configured to process the threads from the plurality of enterprises, wherein the first load balancer on receipt of a processing thread from the enterprise transfers the thread to a selected one of the plurality of processing nodes for identification of the enterprise;

wherein the plurality of processing nodes comprises at least one dedicated processing node that processes all the processing threads from one enterprise of the plurality of enterprises;

wherein the selected one of the plurality of processing nodes identifies the enterprise prior to processing the received processing; and a transfer engine that transfers processing threads from the selected one of the plurality of processing nodes to the at least one dedicated processing node when the enterprise identity is the same as the one enterprise for which the at least one dedicated processing node processes threads without regard for load balancing protocols;

appending a secure transfer identification to the thread subsequent to the step of identifying an identity of the enterprise;

routing the thread with the secure transfer identification back to the load balancer to be transferred to the at least one dedicated processing node.

10. The distributed computer network system of claim 9 wherein the selected one of the plurality of processing nodes that identifies the user is configured to perform a login procedure.

11. The distributed computer network system of claim 9 wherein the transfer identification is a universal resource locater.

12. The distributed computer network system of claim 9 comprises a plurality of login nodes and a processing load balancer, and wherein the first load balancer is a login load balancer that transfers the received processing thread to one of the plurality of login nodes for identification of the enterprise, and wherein the one of the plurality of login nodes transfers the received processing thread to the processing load balancer, wherein the transfer engine in the processing node transfers the received processing thread to the at least one dedicated processing node without regard for load balancing protocols or to one of the remainder of the plurality of processing node using the load balancing protocols.

13. The distributed computer network system of claim 9 wherein the at least one dedicated processing node comprises a plurality of dedicated processing node as a cluster of processing nodes comprises a plurality of dedicated processing nodes and further comprising a cluster load balancer that assigns the processing thread to a selected one of the plurality of dedicated processing nodes.

* * * * *